(12) United States Patent
Avula et al.

(10) Patent No.: US 9,226,327 B2
(45) Date of Patent: Dec. 29, 2015

(54) PROVIDING SERVICES BASED ON RADIO ACCESS NETWORK TYPE INFORMATION

(71) Applicants: Verizon Patent and Licensing Inc., Basking Ridge, NJ (US); Cellco Partnership, Basking Ridge, NJ (US)

(72) Inventors: Niranjan B. Avula, Frisco, TX (US); Priscilla Lau, Fremont, CA (US); Imtiyaz Shaikh, Irving, TX (US); Ning-Chia Yeh, Dublin, CA (US); Sanjeevan Sivalingham, San Jose, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 165 days.

(21) Appl. No.: 13/959,114

(22) Filed: Aug. 5, 2013

(65) Prior Publication Data
US 2015/0036587 A1 Feb. 5, 2015

(51) Int. Cl.
*H04W 76/02* (2009.01)
*H04L 29/06* (2006.01)
*H04W 4/18* (2009.01)

(52) U.S. Cl.
CPC ......... *H04W 76/021* (2013.01); *H04L 65/1016* (2013.01); *H04L 65/1063* (2013.01); *H04L 65/1073* (2013.01); *H04W 4/18* (2013.01)

(58) Field of Classification Search
CPC .................................................. H04W 76/021
See application file for complete search history.

(56) References Cited

U.S. PATENT DOCUMENTS

| | | | |
|---|---|---|---|
| 2011/0282931 A1* | 11/2011 | Chen et al. ..................... | 709/203 |
| 2012/0033638 A1* | 2/2012 | Nishida et al. ................. | 370/331 |
| 2012/0314568 A1* | 12/2012 | Tan et al. ........................ | 370/230 |
| 2014/0089442 A1* | 3/2014 | Kim et al. ....................... | 709/206 |
| 2014/0146711 A1* | 5/2014 | Xue et al. ........................ | 370/259 |
| 2015/0055459 A1* | 2/2015 | Wong et al. .................... | 370/230 |

* cited by examiner

*Primary Examiner* — Jason Mattis

(57) ABSTRACT

A device may receive connection information associated with a connection, between a user device and a network, used to provide an application service to the user device. The connection information may include information identifying a network type of the network. The connection information may include information identifying an access point name associated with the connection. The application service may be provided by a device associated with providing the application service to the user device. The device may store the connection information based on receiving the connection information. The device may determine that the connection information is to be provided to the device associated with providing the application service to the user device, and may provide the connection information to the device associated with the application service. The connection information may permit the application service to be provided based on the network type of the network.

20 Claims, 12 Drawing Sheets

| Device Identifier 510 | Network Type 520 | APN 530 | Time 540 |
|---|---|---|---|
| UD1 | LTE | net.swire | 06-28-13 (11:22) |
| UD1 | WiFi | net.swire | 06-28-13 (11:35) |
| UD1 | eHRPD | net2.swire | 07-01-13 (09:45) |

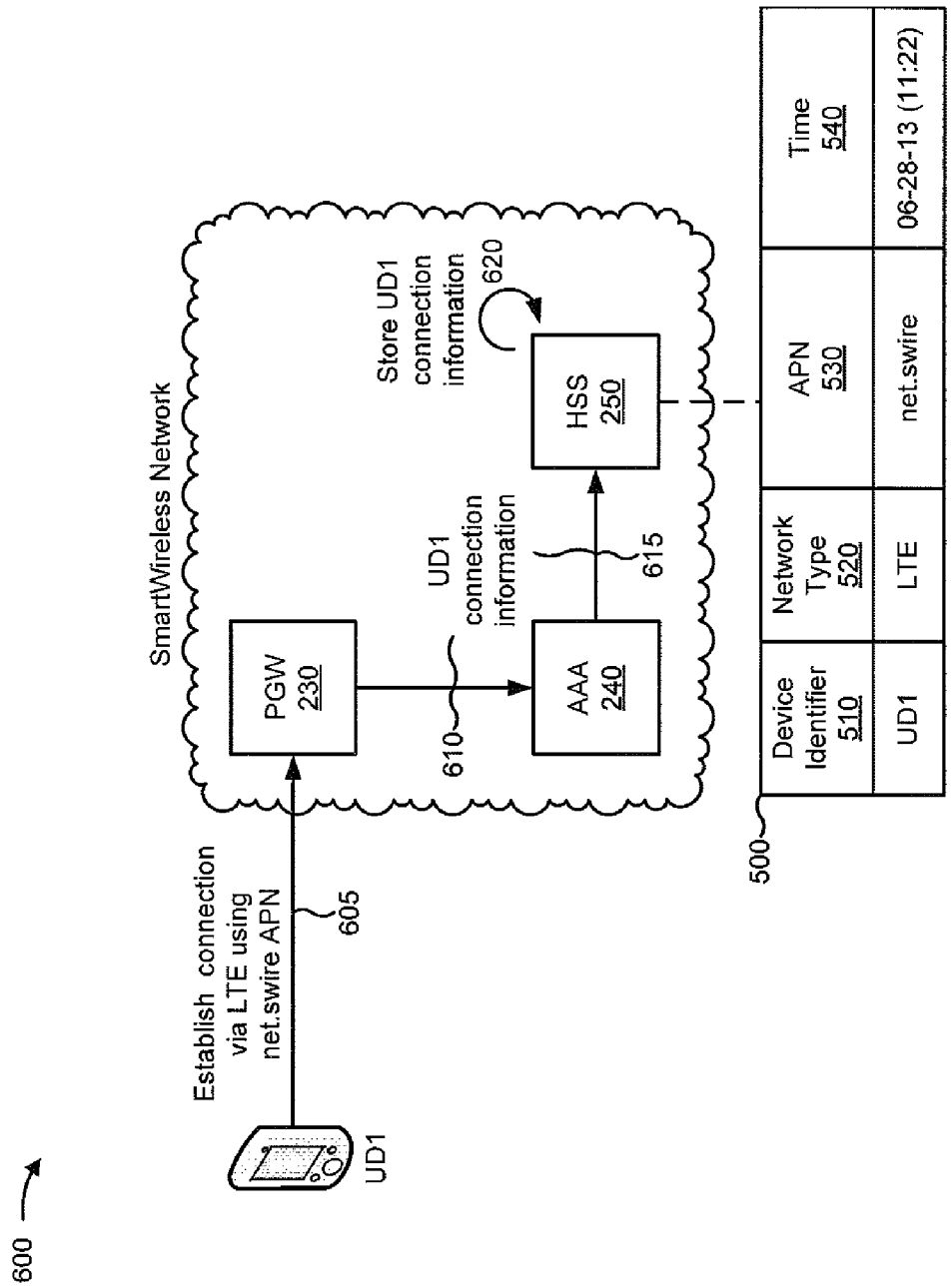

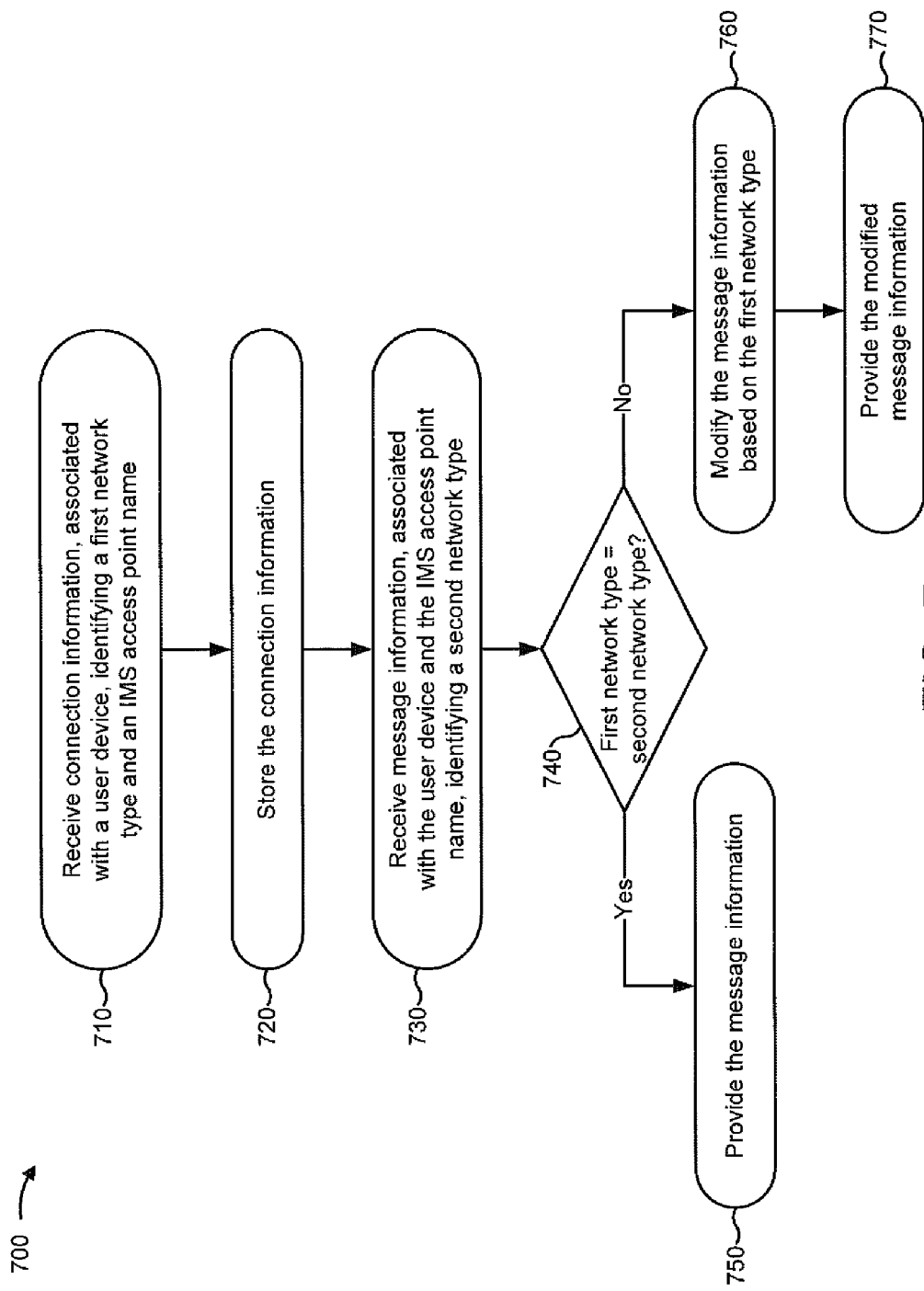

PROVIDING SERVICES BASED ON RADIO ACCESS NETWORK TYPE INFORMATION

BACKGROUND

A radio access network is part of a mobile telecommunication system that may allow a user device to connect to a network associated with a service provider. The user device may receive a service, provided by an application server associated with the network, while connected to the radio access network. The user device may be capable of establishing a connection with multiple radio access networks.

BRIEF DESCRIPTION OF THE DRAWINGS

FIG. 5 is a diagram of an example data structure that stores connection information associated with a connection between a user device and a network;

FIGS. 6A-6C are diagrams of an example implementation relating to the example process shown in FIG. 4;

FIG. 7 is a flow chart of an example process for providing message information, associated with an internet protocol multimedia subsystem service, based on a network type.

DETAILED DESCRIPTION

The following detailed description of example implementations refers to the accompanying drawings. The same reference numbers in different drawings may identify the same or similar elements.

A user device may communicate with an application server via one or more radio access networks (e.g., a wireless local area network (hereinafter referred to as a "WiFi network"), a long term evolution ("LTE") network, an evolved high rate packet data ("eHRPD") network, etc.). The user device may receive a service, provided by the application server, via a connection to the radio access network. However, the application server may not receive information associated with the radio access network type being used to provide the service to the user device. Additionally, the radio access network, used to provide the service to the user device, may change during a time that the service is being provided to the user device (e.g., the user device may connect to an additional radio access network that takes over providing the service, the user device may lose a connection to the radio access network and may establish a connection to another radio access network that provides the service, etc.), and the application server may not receive updated information associated with the radio access network being used to provide the service. Implementations described herein may allow an application server, providing a service to a user device, to receive information identifying a type of radio access network being used to provide the service to the user device without depending on the user device to provide the information identifying the radio access network type.

Figure 1A:
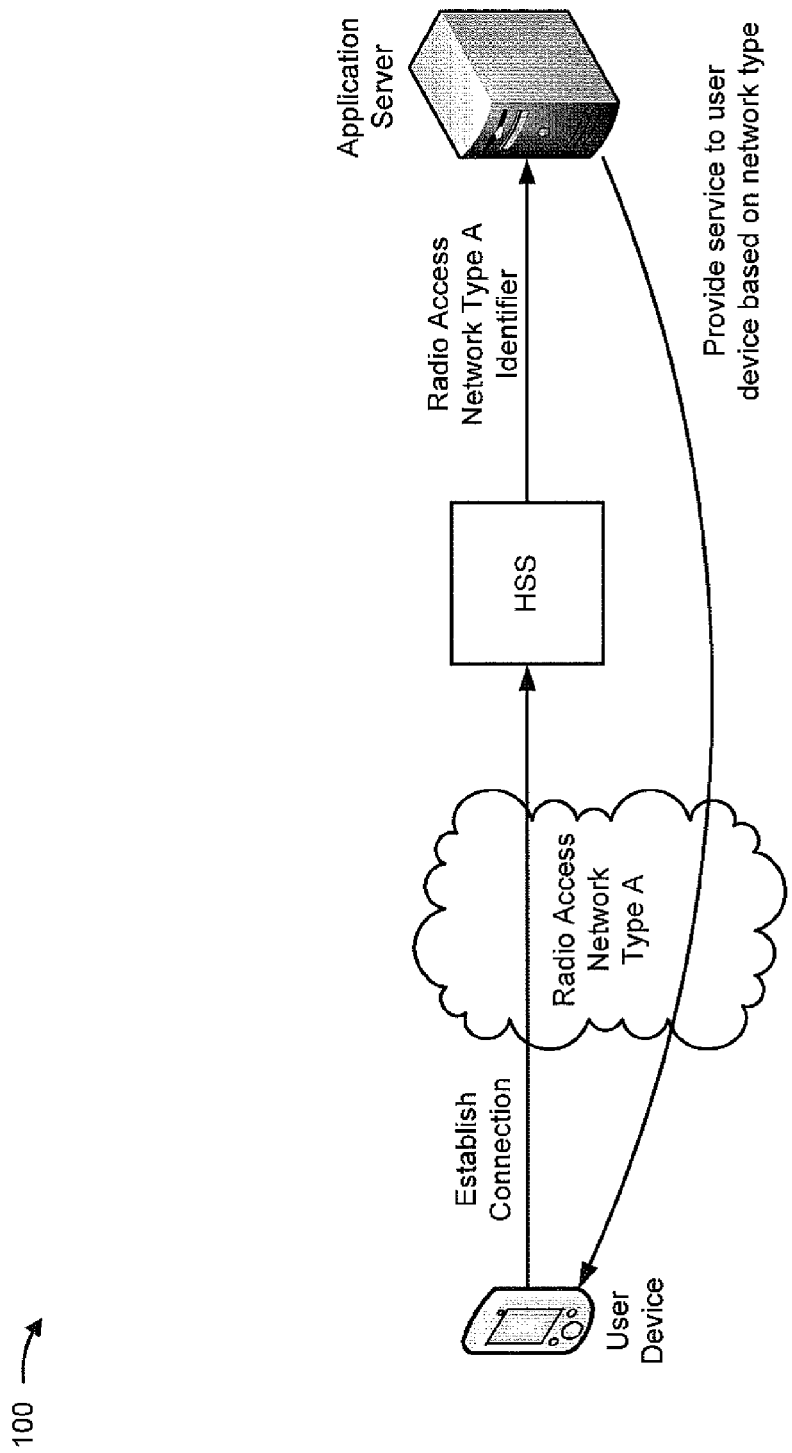
FIGS. 1A and 1B are diagrams of an overview of an example implementation described herein.
Figure 1B:
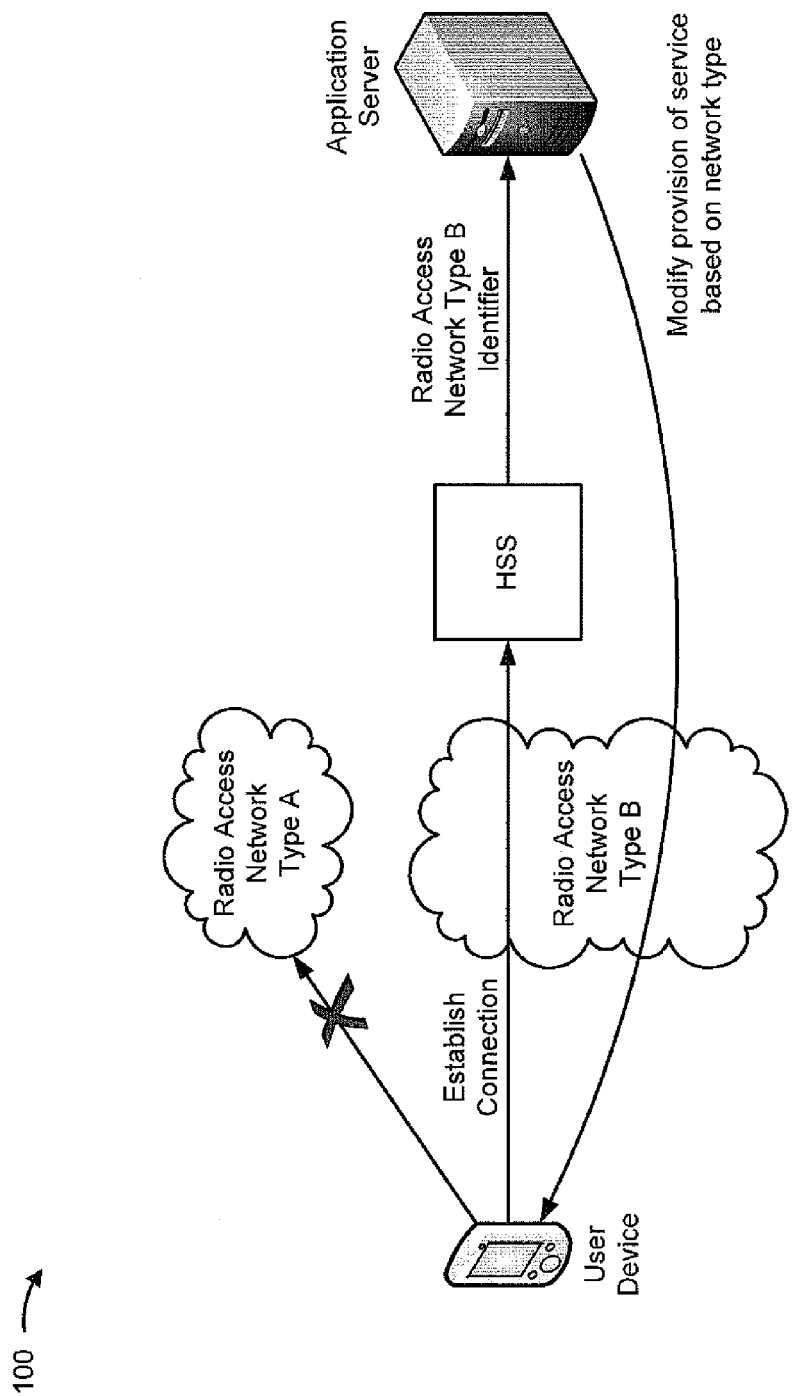

FIGS. 1A and 1B are diagrams of an overview of an example implementation 100 described herein. For the purposes of FIG. 1, assume that a user of a user device wishes to receive a service provided by an application server via a radio access network.

As shown in FIG. 1A, the user device may communicate with the application server by establishing a connection to a radio access network, identified as radio access network type A. As shown, a home subscriber server ("HSS"), associated with the radio access network, may receive information associated with the connection. As further shown in FIG. 1A, the HSS may provide information, identifying radio access network type A, to the application server. As shown, the application server may provide service to the user device based on the type (e.g., type A) of radio access network used to provide the service to the user device.

As shown in FIG. 1B, the user device may lose the connection to radio access network type A during a time that the application server is providing the service to the user device. As also shown, the user device may continue to communicate with the application server by establishing a connection to another radio access network, identified as radio access network type B. Additionally, or alternatively, a user of the user device may decide to change the radio access network type to type B (e.g., a user device may come within range of a WiFi network, and the user may provide input to connect to the WiFi network). As shown, the HSS may receive information associated with the connection to radio access network type B. As further shown, the HSS may provide information, identifying radio access network type B, to the application server. The application server may modify the provision of the service to the user device based on the updated type (e.g., type B) of radio access network, as shown. In this way, an application server, providing a service to a user device, may receive information identifying a type of radio access network being used to provide the service to the user device, and the application server may manage the provision of the service accordingly.

Figure 2:
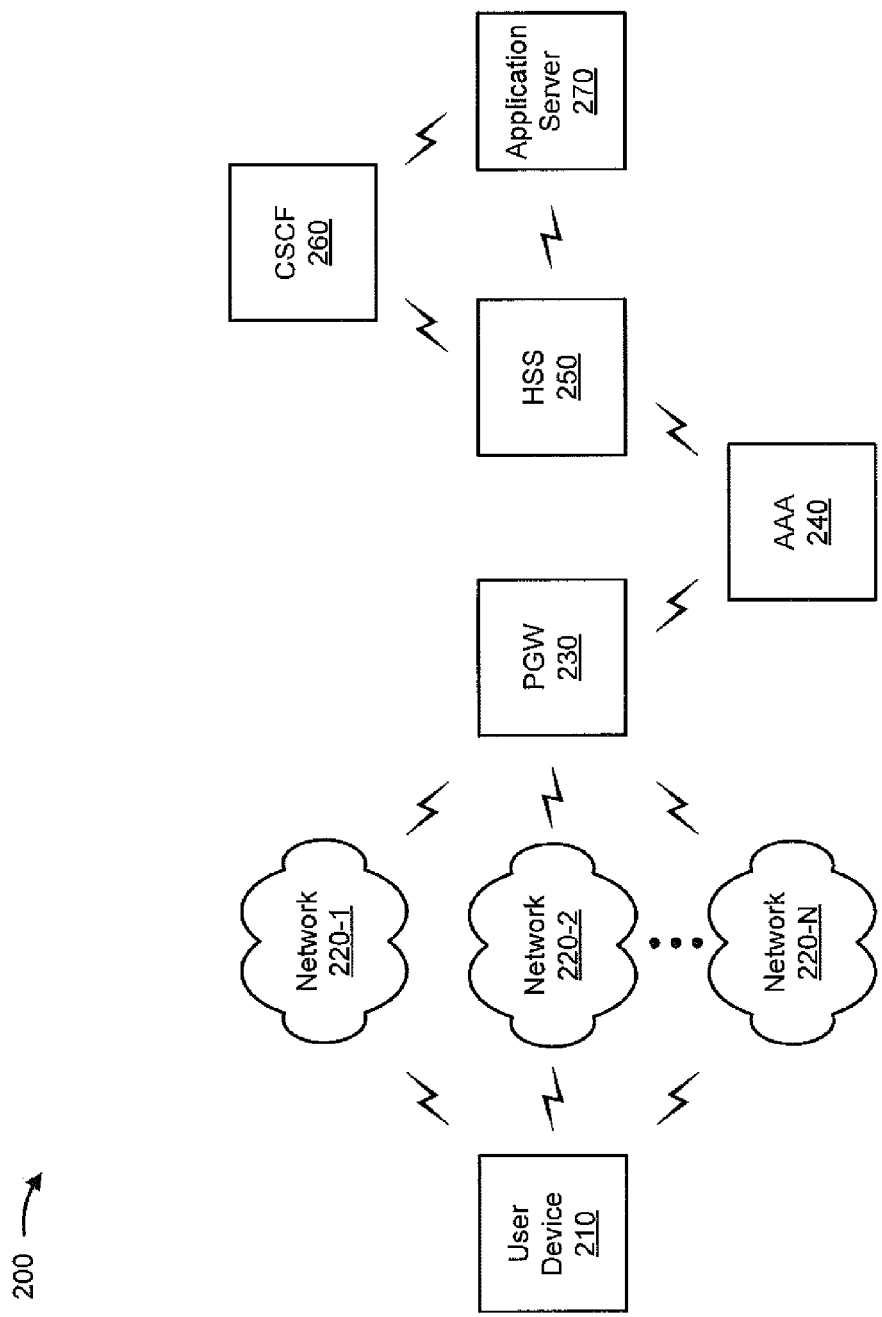
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a user device 210, a set of networks 220-1 through 220-N(N≥1) (hereinafter collectively referred to as "networks 220," and individually as "network 220"), a packet data network ("PDN") gateway 230 (hereinafter referred to as "PGW 230"), an authentication, authorization, and accounting ("AAA") server 240 (hereinafter referred to as "AAA server 240"), a home subscriber server ("HSS") 250 (hereinafter referred to as "HSS 250"), a call session control function ("CSCF") server 260 (hereinafter referred to as "CSCF server 260"), and an application server 270.

User device 210 may include a device capable of communicating with another device (e.g., application server 270) via network 220. For example, user device 210 may include a wired communication device, a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a desktop computer, a laptop computer, a tablet computer, and/or a similar device. In some implementations, user device 210 may include a device capable of communicating with application server 270 (e.g., when application server 270 is providing a service to user device 210). In some implementations, user device 210 may include a device capable of connecting to one or more networks 220. Additionally, or alternatively, user device 210 may include a device capable of being concurrently connected to two or more networks 220 (e.g., at the same time).

Network 220 may include one or more wired and/or wireless networks. For example, network 220 may include a cellular network, a public land mobile network ("PLMN"), a second generation ("2G") network, a third generation ("3G") network, a fourth generation ("4G") network, a fifth generation ("5G") network, an LTE network, an enhanced voice-data optimized ("Ev-DO") code division multiple access ("CDMA") network, an evolved high rate packet data ("eHRPD") network, and/or another type of radio access network. Additionally, or alternatively, network 220 may include a local area network ("LAN") (e.g., a WiFi network), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks. In some implementations, network 220 may allow user device 210 to communicate with another device (e.g., application server 270, PGW 230, etc.). In some implementations, network 220 may include PGW 230, AAA server 240, HSS 250, CSCF server 260, and/or application server 270. In some implementations, networks 220 (e.g., network 220-1, network 220-2, network 220-N, etc.) may include different types of networks.

PGW 230 may include a device capable of providing connectivity for user device 210 to external packet data networks. For example, PGW 230 may include one or more data processing and/or traffic transfer devices, such as a gateway, a router, a modem, a switch, a firewall, a network interface card ("NIC"), a hub, a bridge, a server, an optical add/drop multiplexer ("OADM"), or any other type of device that processes and/or transfers traffic. In some implementations, PGW 230 may include a device capable of sending and/or receiving information that identifies a network type of network 220. Additionally, or alternatively, PGW 230 may include a device capable of sending and/or receiving information identifying an access point name ("APN") associated with user device 210 and/or network 220. In some implementations, PGW 230 may include a device capable of sending information, identifying an APN and/or a network type of network 220, in an authentication and authorization request message to AAA server 240.

AAA server 240 may include one or more devices, such as one or more server devices, capable of managing subscription and/or other information associated with user device 210. For example, AAA server 240 may include a device that performs authentication, authorization, and/or accounting operations associated with a communication session associated with user device 210 and application server 270. In some implementations, AAA server 240 may include a device capable of sending and/or receiving information that identifies a network type of network 220. Additionally, or alternatively, AAA server 240 may include a device capable of sending and/or receiving information identifying an APN associated with user device 210 and/or network 220. In some implementations, AAA server 240 may include a device capable of sending information (e.g., information identifying an APN and/or a network type of network 220) in a server-assignment request message to HSS 250.

HSS 250 may include one or more devices, such as one or more server devices, capable of managing subscription and/or other information associated with user device 210. For example, HSS 250 may receive, store, and/or provide profile information associated with user device 210 that identifies applications, services, and/or APNs that are permitted for use by and/or accessible by user device 210, information associated with a user of user device 210 (e.g., a username, a password, a personal identification number ("PIN"), etc.), subscription information, rate information, minutes allowed, bandwidth allocation policy information, and/or other information. In some implementations, HSS 250 may include a device capable of receiving a network type identifier and/or an APN from AAA server 240, and providing the network type identifier and/or APN to application server 270.

CSCF server 260 may include a device, such as a server, capable of managing signal and control functions in an Internet Protocol ("IP") Multimedia Subsystem ("IMS") network and/or a device capable of coordinating session initiation protocol ("SIP") based services. In some implementations, CSCF server 260 may process and/or route information to and/or from user device 210. For example, CSCF server 260 may process voice calls received via network 220 that are destined for user device 210. In another example, CSCF server 260 may process voice calls received from user device 210 that are destined for network 220. In some implementations, CSCF server 260 may include a device capable of sending and/or receiving information that identifies a network type of network 220. Additionally, or alternatively, CSCF server 260 may include a device capable of sending and/or receiving information identifying an APN (e.g., an IMS APN) associated with user device 210.

Application server 270 may include a device, such as a server, that hosts and/or provides an application service. Application server 270 may host and execute applications and/or services, such as voice services, video services, audio services, gaming services, or the like, and may provide such services to user device 210 via network 220. For example, application server 270 may include a telephony application server, a video application server, a gaming application server, or the like. In some implementations, application server 270 may include a device capable of sending and/or receiving information that identifies a network type of network 220. Additionally, or alternatively, application server 270 may include a device capable of sending and/or receiving information identifying an APN associated with user device 210. In some implementations, application server 270 may include a device capable of managing the provisioning of an application service, to user device 210, based on the network type of network 220.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. For example, in practice, environment 200 may include other types of network devices, such as base stations, serving gateways ("SGW"), or the like.

Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
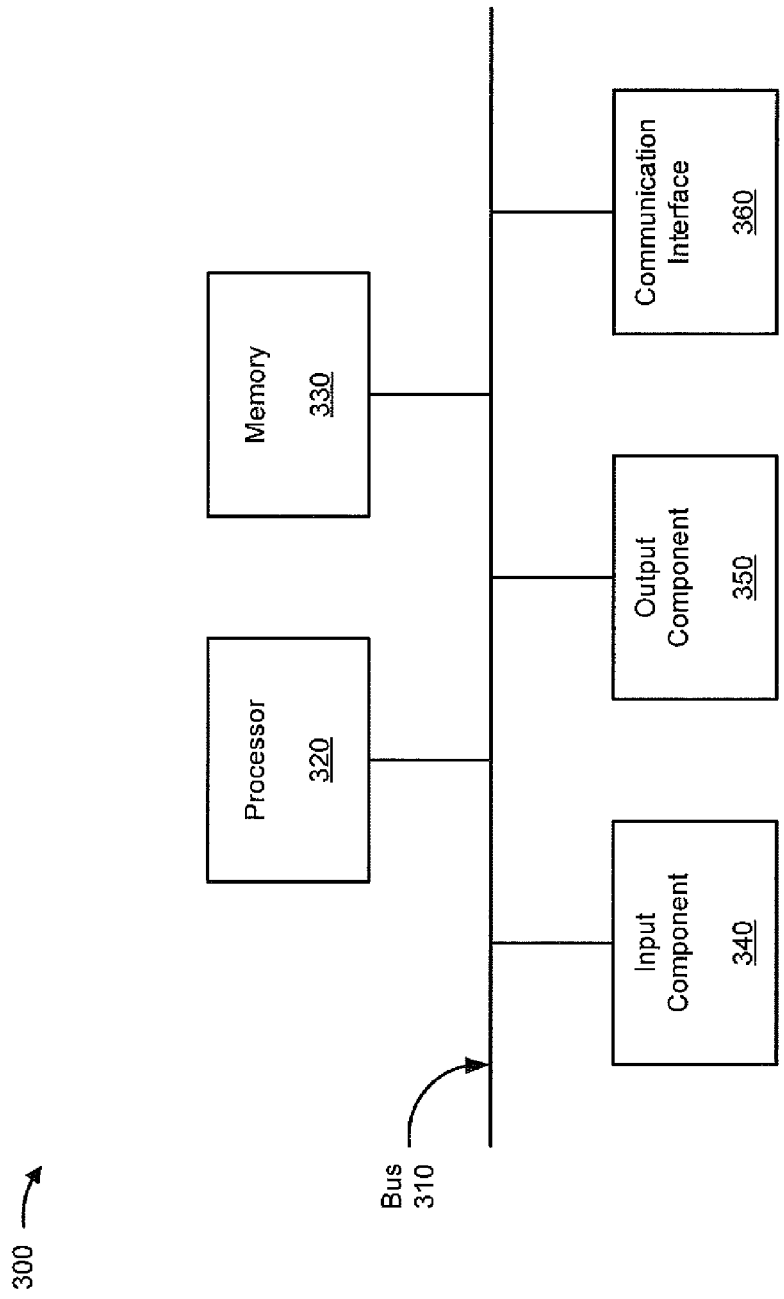
FIG. 3 is a diagram of example components of one or more devices of FIG. 2.

FIG. 3 is a diagram of example components of a device 300. Device 300 may correspond to user device 210, PGW 230, AAA server 240, HSS 250, CSCF server 260, and/or application server 270. Additionally, or alternatively, each of user device 210, PGW 230, AAA server 240, HSS 250, CSCF server 260, and/or application server 270 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
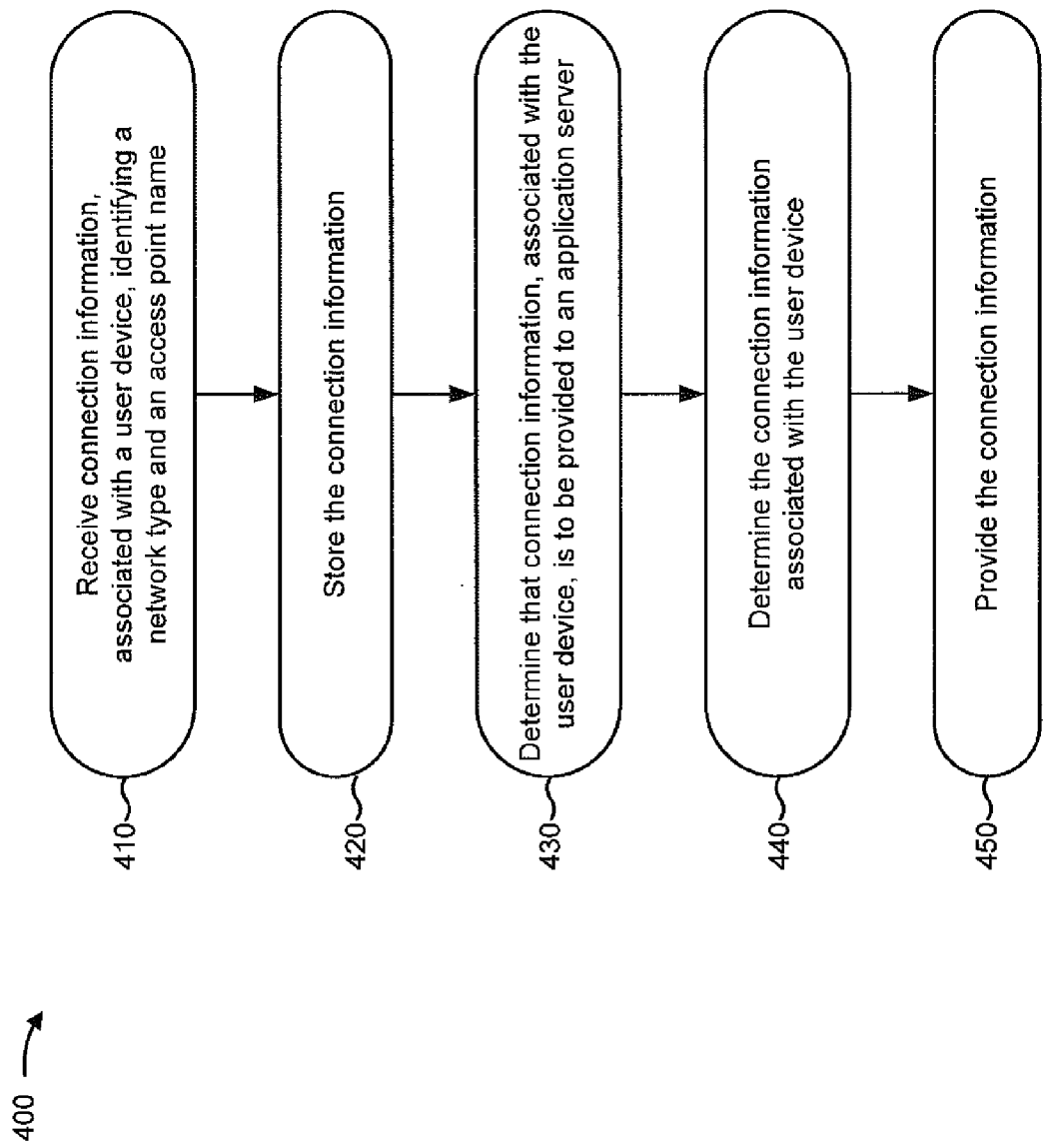
FIG. 4 is a flow chart of an example process for receiving and providing connection information, associated with a user device, identifying a network type and an access point name.

FIG. 4 is a flow chart of an example process 400 for receiving and providing connection information, associated with a user device, identifying a network type and an access point name. In some implementations, one or more process blocks of FIG. 4 may be performed by HSS 250. In some implementations, one or more process blocks of FIG. 4 may be performed by another device or a group of devices separate from or including HSS 250, such as PGW 230, AAA server 240, CSCF server 260, and/or application server 270.

As shown in FIG. 4, process 400 may include receiving connection information, associated with a user device, identifying a network type and an access point name (block 410). For example, HSS 250 may receive connection information, associated with a connection between user device 210 and network 220, that identifies a network type (e.g. a radio access network type) of network 220, and an APN associated with the connection. In some implementations, HSS 250 may receive the connection information from AAA server 240 and/or PGW 230. Additionally, or alternatively, HSS 250 may receive the connection information from another device associated with network 220, such as a based station or SGW associated with network 220.

In some implementations, HSS 250 may receive the connection information from AAA server 240 after AAA server 240 receives the connection information from PGW 230. In some implementations, HSS 250 may receive the connection information after user device 210 establishes a connection to network 220. Additionally, or alternatively, HSS 250 may receive the connection information when a service, managed by application server 270, is provided to user device 210 via network 220. In some implementations, HSS 250 may receive connection information associated with multiple connections to multiple networks 220 (e.g., where user device 210 is concurrently connected to multiple networks 220). In some implementations, the connection information may be determined by a device (e.g., PGW 230, AAA server 240, etc.) associated with establishing the connection between user device 210 and network 220, and the device may provide the connection information to HSS 250.

Connection information may include information associated with a connection between user device 210 and a network 220. For example, the connection information may include information associated with network 220 (e.g., a network identifier, a network type, etc.). Additionally, or alternatively, the connection information may include information associated with a service to be provided to user device 210 (e.g., an APN used to provide the service, subscription information associated with the service and/or user device 210, etc.). Additionally, or alternatively, the connection information may also include information associated with a time of the connection (e.g., a date that the connection was established, a time that the connection was established, etc.). In some implementations, the connection information may be used by a device associated with network 220 (e.g., CSCF server 260, application server 270, etc.) to manage the provision of the service to user device 210 (e.g., the service may be managed based on the network type associated with the connection, the service may be managed based on the APN used to provide the service, etc.).

As further shown in FIG. 4, process 400 may include storing the connection information (block 420). For example, HSS 250 may store the connection information in a data structure. In some implementations, HSS 250 may store information associated with the connection information, such as a user device identifier (e.g., a string of characters, an international mobile subscriber identity ("IMSI"), a mobile subscriber integrated services digital network number ("MSISDN"), a mobile directory number ("MDN"), etc.) that identifies a user device 210 associated with the connection information. In some implementations, HSS 250 may store the connection information in a memory location (e.g., a RAM, a hard disk, etc.) of HSS 250, and HSS 250 may store an indication that the connection information is associated with user device 210 and/or network 220. Additionally, or alternatively, HSS 250 may provide the connection information to another device (e.g., a device associated with network 220, etc.) for storage.

As further shown in FIG. 4, process 400 may include determining that connection information, associated with the user device, is to be provided to an application server (block 430). For example, HSS 250 may determine that connection information, associated with user device 210, is to be provided to application server 270.

In some implementations, HSS 250 may determine that the connection information is to be provided based on information received from application server 270. For example, application server 270 may, before providing a service to user device 210, request the connection information from HSS 250 (e.g., the request may be based on a user identifier associated with user device 210, an APN associated with user device, 210, etc.). As such, HSS 250 may determine that the connection information is to be provided to application server 270 based on the request received from application server 270. Additionally, or alternatively, application server 270 may send a user identifier, associated with user device 210, and an APN, associated with the connection, to HSS 250. HSS 250 may determine that connection information (e.g., a network type associated with the APN and/or user identifier) is to be provided to application server 270.

Additionally, or alternatively, HSS 250 may determine that the connection information is to be provided to application server 270 based on information received from AAA 240. For example, a first network 220 may begin providing the service, associated with application server 270, to user device 210 (e.g., after HSS 250 provides first connection information to application server 270). User device 210 may establish a second connection to a second network 220 that may take over providing the service to user device 210. HSS 250 may receive, from AAA server 240, second connection information associated with the second network 220, and may determine that the second connection information, associated with the second network 220, is to be provided to application server 270 based on receiving the connection information from AAA server 240. Additionally, or alternatively, HSS 250 may determine that the connection information is to be provided when the network 220 providing the service changes to another network 220 (e.g., when user device 210 establishes a connection to another network 220 that takes over providing the service to user device 210).

Additionally, or alternatively, HSS 250 may determine that the connection information is to be provided to application server 270 based on information associated with a subscription of application server 270. For example, application server 270 may subscribe to receive updated connection information (e.g., when the network type of network 220 changes) associated with user device 210, and HSS 250 may provide the updated connection information for user device 210 based on determining that application server 270 has subscribed to receive updated connection information for user device 210.

As further shown in FIG. 4, process 400 may include determining the connection information associated with the user device (block 440). For example, HSS 250 may determine the connection information based on information stored by HSS 250. As another example, HSS 250 may determine the connection information based on information stored by another device (e.g., PGW 230, AAA 240, etc.). In some implementations, the connection information may be included in a data structure stored by HSS 250 and/or another device (e.g., PGW 230, AAA server 240, etc.).

In some implementations, HSS 250 may determine the connection information based on determining that the connection information is to be provided to application server 270. Additionally, or alternatively, HSS 250 may determine the connection information based on information indicating that HSS 250 is to provide the connection information to another device (e.g., CSCF server 260) associated with the connection between user device 210 and network 220.

As further shown in FIG. 4, process 400 may include providing the connection information (block 450). For example, HSS 250 may provide the connection information to application server 270. As another example, HSS 250 may provide the connection information to another device (e.g., CSCF server 260) associated with the connection between user device 210 and network 220. In some implementations, HSS 250 may provide the connection information based on determining the connection information stored by HSS 250. Additionally, or alternatively, HSS 250 may provide the connection information based on determining the connection information by receiving the connection information from another device (e.g., PGW 230, AAA server 240, etc.).

In some implementations, a device associated with providing an application service (e.g., application server 270) may receive the connection information from HSS 250 and may manage (e.g., by implementing a network type specific billing scheme, by implementing a network type specific treatment, etc.) the application service being provided to user device 210 based on the information identifying the network type of network 220 regardless of the APN associated with the connection information. For example, application server 270 may implement a specific billing procedure (e.g., a user of user device 210 may be charged) for receiving the application service via a particular network type (e.g., LTE), whereas application server 270 may not implement a billing procedure (e.g., a user of user device 210 may not be charged) for receiving the application service via another network type (e.g., WiFi).

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

FIG. 5 is a diagram of an example data structure 500 that stores connection information associated with a connection between a user device and a network. Data structure 500 may be stored in a memory device (e.g., a RAM, a hard disk, etc.) associated with one or more devices and/or components of FIG. 2 and/or FIG. 3. For example, data structure 500 may be stored by HSS 250, PGW 230, AAA server 240, CSCF server 260, and/or application server 270.

As shown in FIG. 5, data structure 500 may include a collection of fields, such as a device identifier field 510, a network type field 520, an APN field 530, and a time field 540.

Device identifier field 510 may store information that identifies user device 210 associated with a connection, between a user device 210 and network 220, used to provide an application service to user device 210. For example, device identifier field 510 may store information identifying user device 210, connected to network 220, using a string of characters (e.g., UD1), an IMSI associated with user device 210, an MSISDN associated with user device 210, an MDN associated with user device 210, or the like.

Network type field 520 may store information that identifies a network type of network 220 associated with the connection between user device 210, identified in device identifier field 510, and network 220 used to provide the application service. For example, network type field 520 may store information indicating that network 220 is an LTE network (e.g., "LTE"), may store information indicating that network 220 is a WiFi network (e.g., "WiFi"), may store information indicating that network 220 is an eHRPD network (e.g., "eHRPD"), or the like.

APN field 530 may store information that identifies an access point name associated with the connection between user device 210, identified in device identifier field 510, and network 220, associated with the network type in network type field 520. For example, APN name field 530 may store information identifying an access point name (e.g., net.swire, net2.swire, etc.), used by user device 210, that may allow a service (e.g., a service provided by application server 270) to be provided to user device 210.

Time field 540 may store information that identifies a date and/or a time associated with the connection between user device 210, identified in device identifier field 510, and network 220, associated with the network type in network type field 520. For example, time field 540 may store information identifying a date (e.g., 06-28-13) and/or a time (e.g., 11:22) that the connection, between user device 210 and network 220, was established.

Connection information, associated with a connection between user device 210 and network 220, may be conceptually represented as a single row in data structure 500. For example, the first row of data structure 500 may correspond to a connection between user device 210, identified as UD1, and an LTE network 220. As shown, the connection may be associated with a particular APN, identified as net.swire. As further shown, the connection may have been established on Jun. 28, 2013 (e.g., 06-28-13) at 11:22 a.m. (e.g., 11:22).

Data structure 500 includes fields 510-540 for explanatory purposes. In practice, data structure 500 may include additional fields, fewer fields, different fields, or differently arranged fields than those shown in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or a component. Additionally, or alternatively, data structure 500 may include information provided from another source, such as information provided by a user and/or information automatically provided by a device.

Figure 6B:
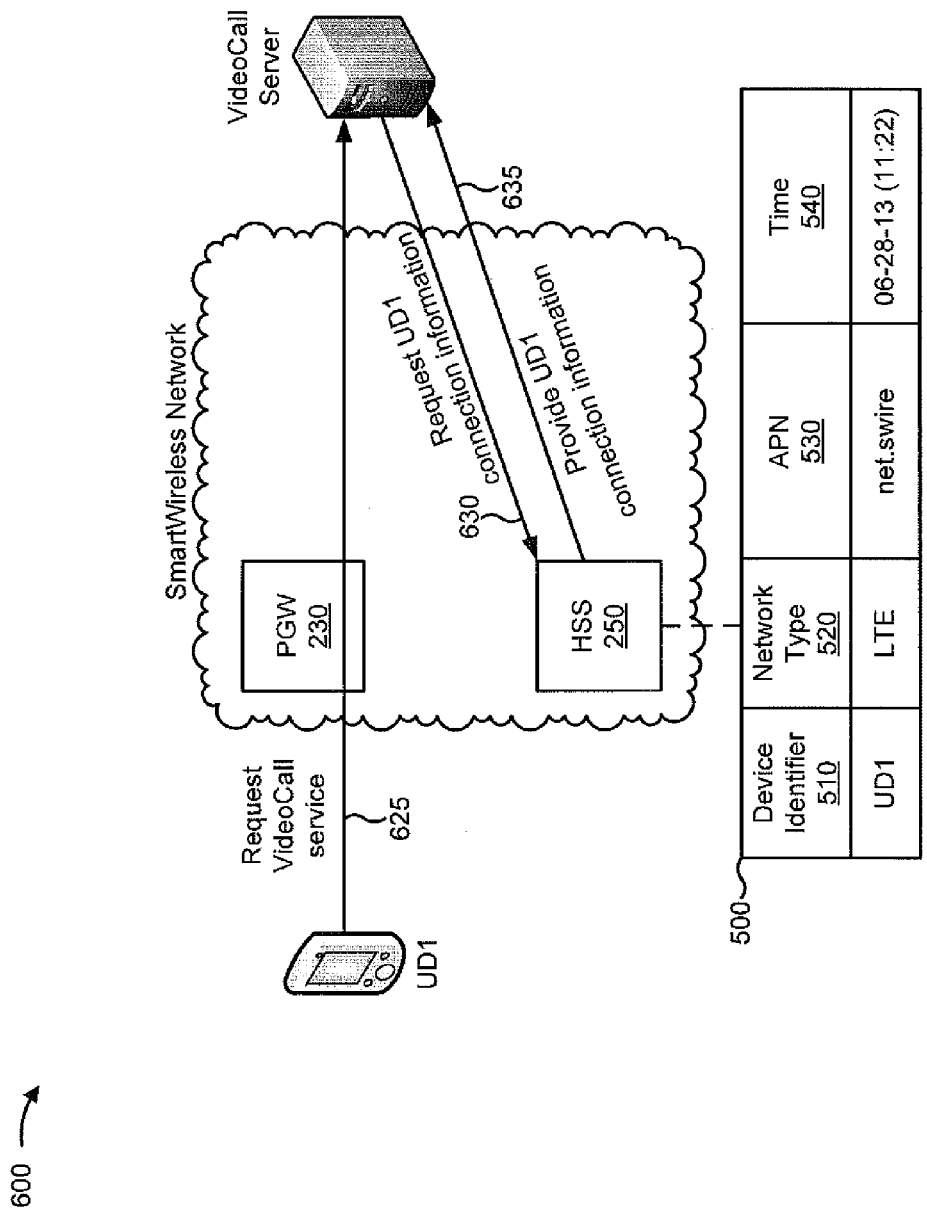
Figure 6C:
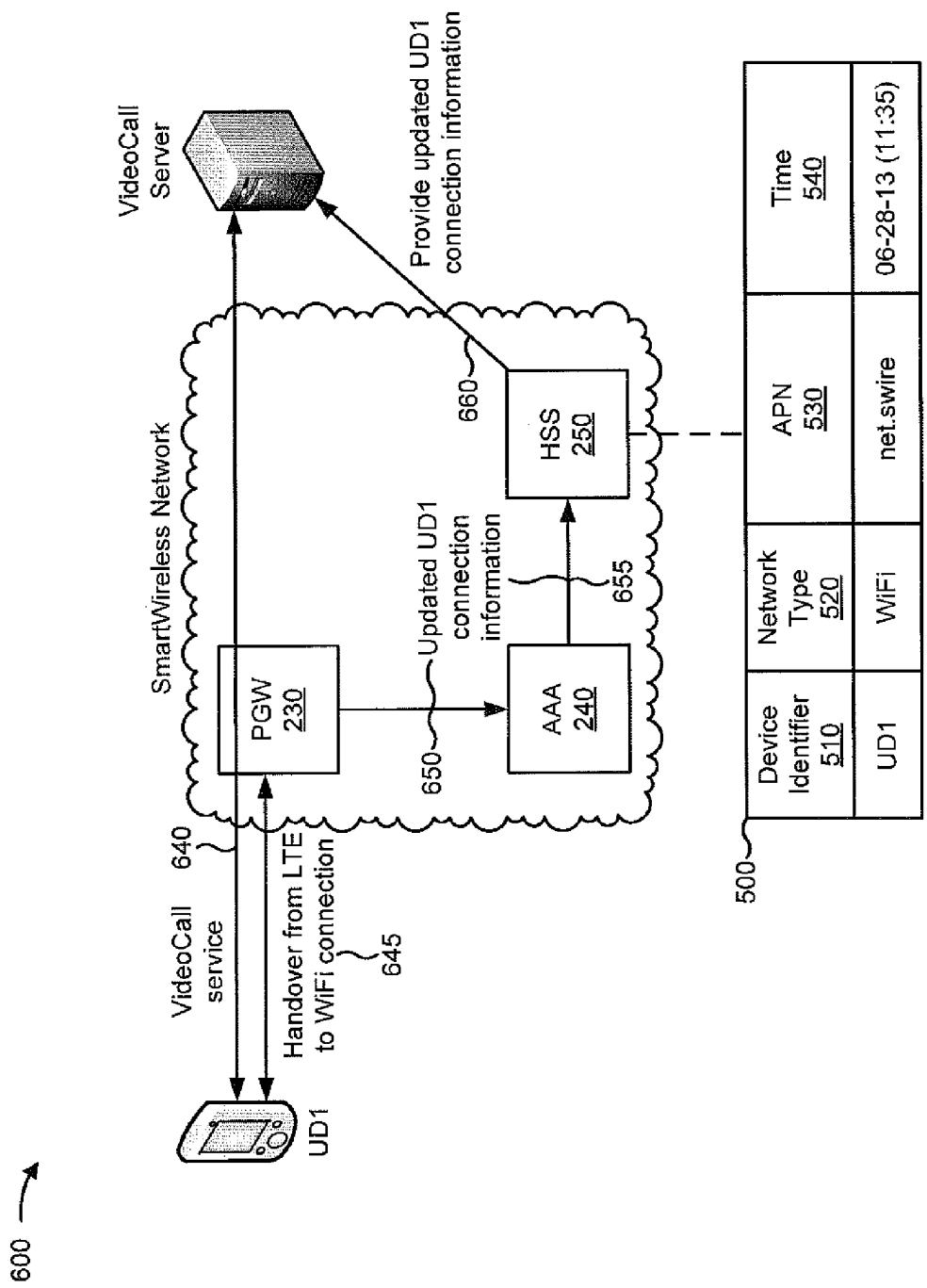

FIGS. 6A-6C are diagrams of an example implementation 600 relating to example process 400 shown in FIG. 4. For the purposes of example implementation 600, assume that user device UD1 is attempting to establish a connection via an LTE network associated with a service provider, identified as SmartWireless.

As shown in FIG. 6A, and by reference number 605, UD1 may establish a connection with PGW 230 (e.g., using the net.swire APN). As shown by reference number 610, PGW 230 may send connection information, associated with the UD1 connection, to AAA server 240. The connection information may include a device identifier of UD1, information identifying the network, associated with the connection, as an LTE network, information identifying the use of the net.swire APN, and information indicating that the connection was established on Jun. 28, 2013 at 11:22 a.m. As shown by reference number 615, AAA server 240 may send the connection information, received from PGW 230, to HSS 250. As shown by reference number 620, HSS 250 may store (e.g., in data structure 500) the connection information in a memory location associated with HSS 250.

As shown in FIG. 6B, and by reference number 625, UD1 may send (e.g., via the connection established with PGW 230 using the net.swire APN) a service request to receive a service provided by a VideoCall server. As shown by reference number 630, the VideoCall server may send, to HSS 250, a request to provide the connection information, associated with UD1, after receiving the service request. As shown, HSS 250 may determine the connection information (e.g., based on the user device identifier associated with the connection), and, as shown by reference number 635, may provide the connection information to the VideoCall server. The VideoCall server may then provide the VideoCall service to UD1 based on the connection information (e.g., the VideoCall server may implement specific billing and/or connection treatment procedures associated with providing the VideoCall service via an LTE connection).

As shown in FIG. 6C, and by reference number 640, UD1 may be receiving the VideoCall service from the VideoCall server (e.g., UD1 may be currently on a video call with another user device 210). As shown by reference number 645, assume that service to UD1 is handed over from the LTE network to a WiFi network (e.g., the WiFi network may begin to provide services to UD1 rather than the LTE network) while UD1 is receiving the VideoCall service. UD1 may establish a connection to PGW 230 (e.g., using the net.swire APN) via the WiFi network. PGW 230 may determine updated connection information associated with the WiFi connection. The updated connection information may include a device identifier of UD1, information identifying the network, associated with the connection, as a WiFi network, information identifying the net.swire APN, and information indicating the connection was established on Jun. 28, 2013 at 11:35 a.m. As shown by reference number 650, PGW 230 may send the updated connection information to AAA server 240. As shown by reference number 655, AAA server 240 may send the updated connection information, received from PGW 230, to HSS 250. As shown by reference number 660, HSS 250 may store (e.g., in data structure 500) the connection information in a memory location associated with HSS 250, and may provide the updated connection information to the VideoCall server. The VideoCall server may then provide the VideoCall service to UD1 based on the updated connection information (e.g., the VideoCall server may implement specific billing and/or connection treatment procedures associated with providing the VideoCall service over a WiFi connection).

As indicated above, FIGS. 6A-6C are provided merely as an example. Other examples are possible and may differ from what was described with regard to FIGS. 6A-6C.

FIG. 7 is a flow chart of an example process 700 for providing message information, associated with an IMS service, based on a network type. In some implementations, one or more process blocks of FIG. 7 may be performed by CSCF server 260. In some implementations, one or more process blocks of FIG. 7 may be performed by another device or a group of devices separate from or including CSCF server 260, such as AAA 240 and/or HSS 250.

As shown in FIG. 7, process 700 may include receiving connection information, associated with a user device, identifying a first network type and an IMS access point name (block 710). For example, CSCF server 260 may receive connection information, associated with a connection, between user device 210 and network 220, that identifies a first network type of network 220 and an IMS APN. In some implementations, CSCF server 260 may receive the connection information from HSS 250 (e.g., via a session initiation protocol (SIP) message during SIP registration). Additionally, or alternatively, CSCF server 260 may receive the connection information from AAA server 240 and/or PGW 230 (e.g., via a SIP message). Additionally, or alternatively, CSCF server 260 may receive the connection information from another device associated with network 220, such as a based station or SGW associated with network 220.

In some implementations, CSCF server 260 may receive the connection information from HSS 250 after HSS 250 receives the connection information from AAA server 240 (e.g., HSS 250 may provide updated connection information to CSCF server 260 based on receiving the updated connection information from AAA server 240). In some implementations, CSCF server 260 may receive the connection information after user device 210 establishes a connection with network 220. Additionally, or alternatively, CSCF server 260 may receive the connection information when an IMS service, managed by application server 270, is provided to user device 210 via network 220 (e.g., a messaging service, such as a chat messaging service, a text messaging service, an instant messaging service, a file transfer service, etc.). In some implementations, the connection information may be determined by a device (e.g., PGW 230, AAA server 240, HSS 250, etc.) associated with establishing the connection between user device 210 and network 220, and may be provided by the device to CSCF server 260.

In some implementations, CSCF server 260 may receive the connection information from HSS 250 based on information associated with an APN included in the connection information. For example, HSS 250 may determine that the APN, included in the connection information, is associated with an IMS network, and HSS 250 may send the connection information to CSCF server 260 (e.g., where CSCF server 260 manages signal and control functions in the IMS network). In some implementations, CSCF server 260 may request the connection information from HSS 250 (e.g., when CSCF server 260 receives a request to manage a connection associated with the connection information). Additionally, or alternatively, HSS 250 may provide the connection information to CSCF server 260 based on a change in the connection information.

As further shown in FIG. 7, process 700 may include storing the connection information (block 720). For example, CSCF server 260 may store the connection information in a data structure. In some implementations, CSCF server 260 may store information associated with the connection information, such as a user device identifier (e.g., a string of characters, an IMSI, an MSISDN, an MDN, etc.) that identifies user device 210 associated with the connection information. In some implementations, CSCF server 260 may store the connection information in a memory location (e.g., a RAM, a hard disk, etc.) of CSCF server 260, and CSCF server 260 may store an indication that the connection information is associated with user device 210 and/or network 220. Additionally, or alternatively, CSCF server 260 may provide the connection information to another device (e.g., a device associated with network 220, etc.) for storage.

As further shown in FIG. 7, process 700 may include receiving message information, associated with the user device and the IMS access point name, identifying a second network type (block 730). For example, CSCF server 260 may receive message information (e.g., a SIP message), provided by user device 210, and associated with a connection using an IMS APN. In some implementations, CSCF server 260 may receive the message information from PGW 230 after PGW 230 receives the message information from user device 210. Additionally, or alternatively, CSCF server 260 may receive the message information from another device associated with network 220.

Message information may include information, provided by user device 210, associated with a connection using an IMS APN. For example, user device 210 may establish a connection to network 220 using an APN associated with provisioning of an IMS service. User device 210 may send a message, associated with the IMS service, to CSCF server 260 (e.g., where the message is destined for application server 270). The message information may include information identifying a second network type associated with the connection between user device 210 and network 220, and may also include information indicating that the message was passed through network 220 via the connection using the IMS APN. In some implementations, message information may include a SIP message.

As further shown in FIG. 7, process 700 may include determining whether the message information identifying the second network type matches the connection information identifying the first network type (block 740). For example, CSCF server 260 may determine whether the second network type, included in the message information provided by user device 210, matches the first network type, included in the connection information received from HSS 250 (e.g., CSCF server 260 may determine whether the network type provided by user device 210 correctly identifies the network type associated with the connection between user device 210 and network 220). In some implementations, CSCF server 260 may determine whether the second network type matches the first network type based on receiving the message information. Additionally, or alternatively, HSS 250 may determine whether the first network type matches the second network type, and may provide information to CSCF server 260 indicating whether the first network type matches the second network type.

In some implementations, CSCF server 260 may determine whether the second network type matches the first network type based on information stored by CSCF server 260 (e.g., CSCF server 260 may determine the first network type based on the connection information stored by CSCF server 260). Additionally, or alternatively, CSCF server 260 may determine whether the second network type matches the first network type based on receiving information stored by another device associated with network 220 (e.g., PGW 230, AAA server 240, HSS 250, etc.).

As further shown in FIG. 7, if the information identifying the second network type matches the information identifying the first network type (block 740—YES), then process 700 may include providing the message information (block 750). For example, CSCF server 260 may determine that the second network type, included in the message information, matches the first network type, included in the connection information, and CSCF server 260 may provide the message information to application server 270. Additionally, or alternatively, HSS 250 may determine that the second network type matches the first network type. In some implementations, HSS 250 may not provide a notification to CSCF server 260 when the second network type matches the first network type.

In some implementations, CSCF server 260 may provide the message information without modifying the message information (e.g., CSCF server 260 may forward the message information without altering the message information). In some implementations, CSCF server 260 may provide the message information to application server 270 associated with an IMS service that is to be provided to user device 210.

In some implementations, CSCF server 260 may provide the message information to another device associated with the IMS service.

As further shown in FIG. 7, if the information identifying the second network type does not match the information identifying the first network type (block 740—NO), then process 700 may include modifying the message information based on the first network type (block 760). For example, CSCF server 260 may determine that the second network type, included in the message information, does not match the first network type, included in the connection information, and CSCF server 260 may modify the message information based on the first network type. In some implementations, CSCF server 260 may modify the message information by modifying the information identifying the second network type based on the information identifying the first network type (e.g., CSCF server 260 may replace the second network type with the first network type). Additionally, or alternatively, CSCF server 260 may modify the message information by adding information to the message that indicates that the second network type does not match the first network type (e.g., without altering the original contents of the message information).

As further shown in FIG. 7, process 700 may include providing the modified message information (block 770). For example, CSCF server 260 may provide the modified message information to application server 270. In some implementations, CSCF server 260 may provide the modified message information to application server 270 associated with an IMS service that is to be provided to user device 210. In some implementations, CSCF server 260 may provide the modified message information to another device associated with the IMS service.

In this manner, management of an IMS service (e.g., an IMS service provided via a connection using an IMS APN) may be simplified (e.g., if CSCF server 260 stores the connection information, then CSCF server 260 does not have to retrieve network type information from HSS 250 each time message information, associated with the IMS service, is received by CSCF server 260). The message information (or modified message information), provided by CSCF server 260, may be used by application server 270 to manage the provisioning of the IMS service to user device 210 (e.g., the service may be managed based on the network type associated with the connection using the IMS APN).

Although FIG. 7 shows example blocks of process 700, in some implementations, process 700 may include additional blocks, different blocks, fewer blocks, or differently arranged blocks than those depicted in FIG. 7. Additionally, or alternatively, two or more of the blocks of process 700 may be performed in parallel.

Figure 8A:
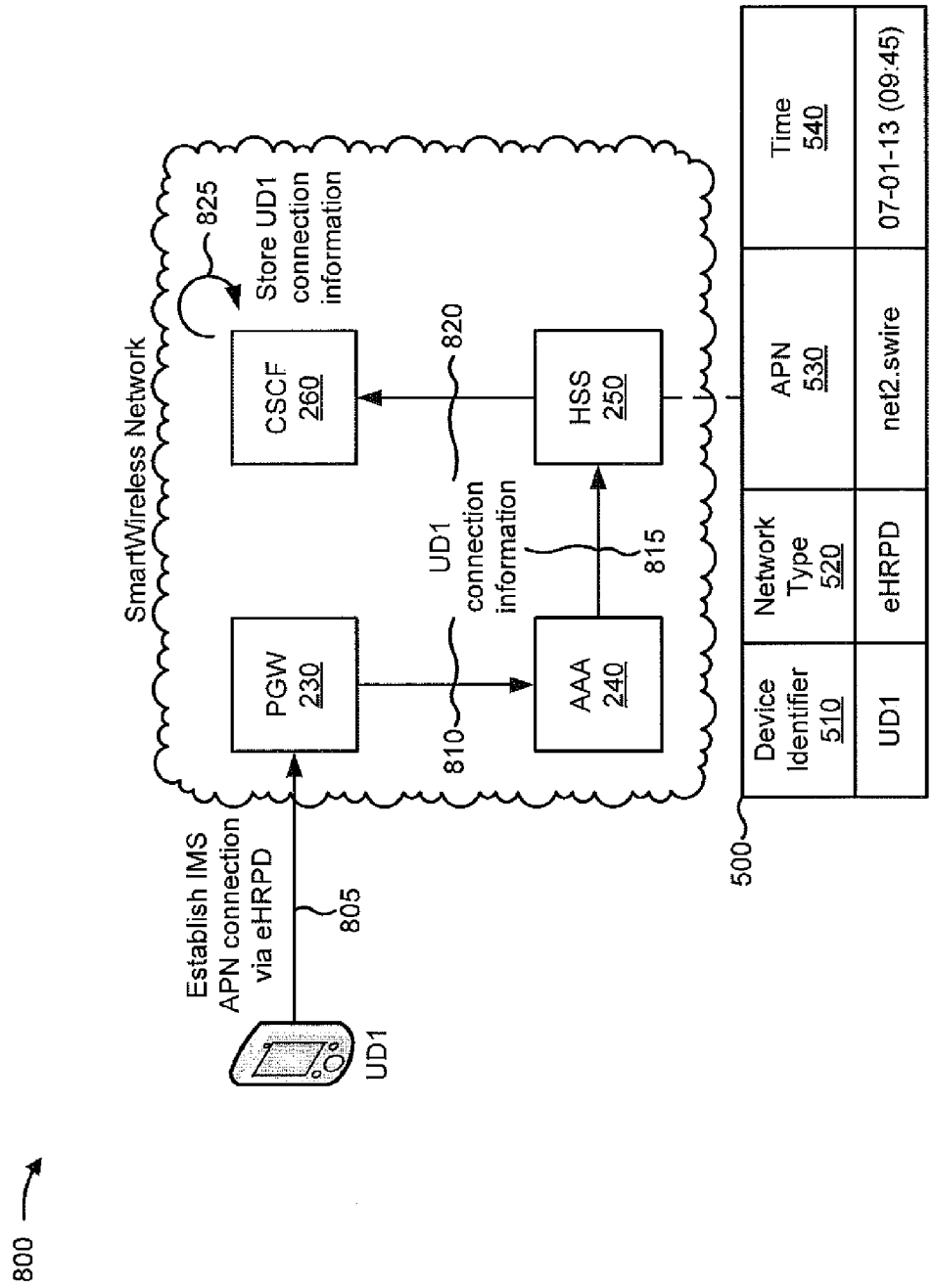
FIGS. 8A and 8B are diagrams of an example implementation relating to the example process shown in FIG. 7.
Figure 8B:
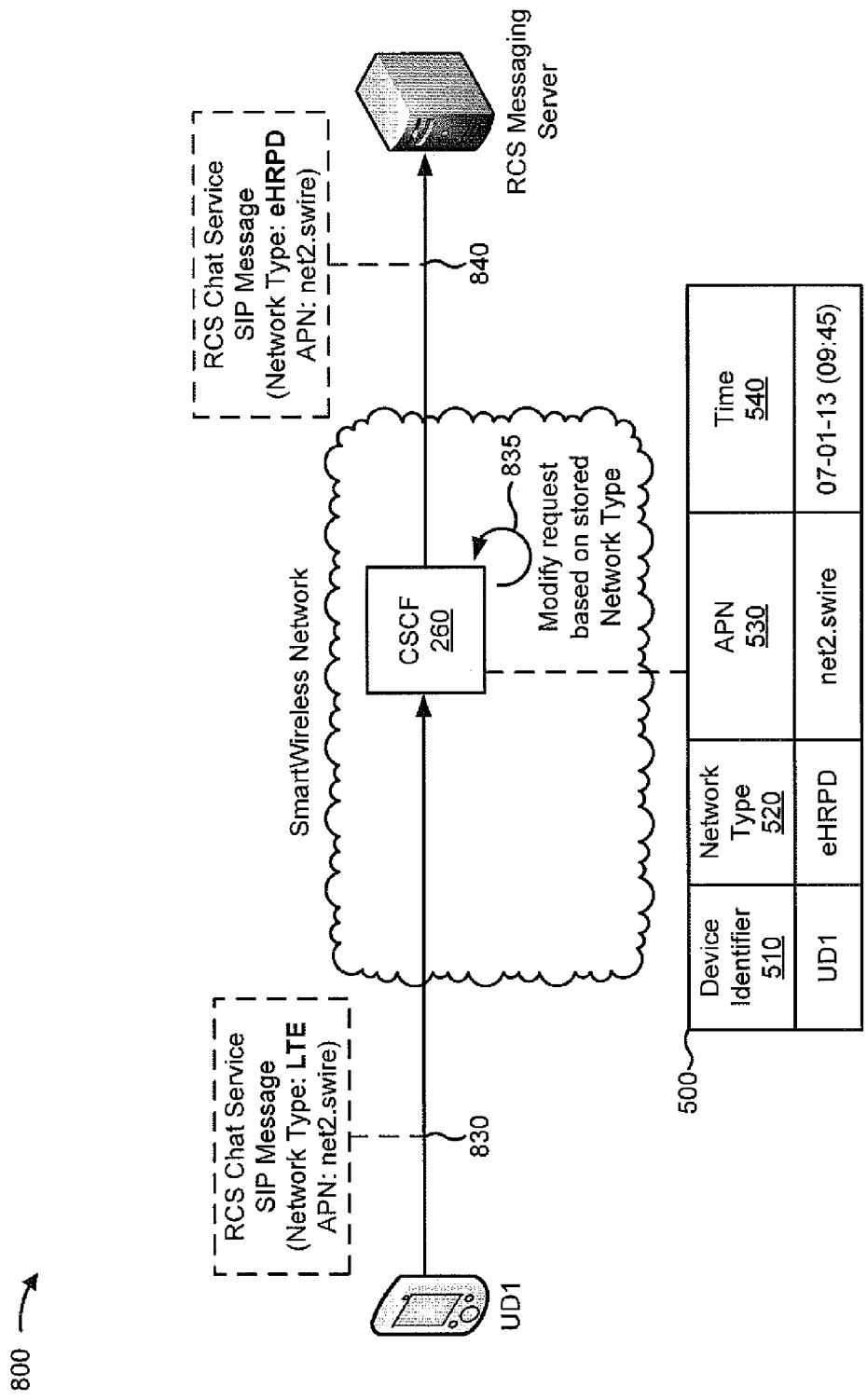

FIGS. 8A and 8B are diagrams of an example implementation 800 relating to example process 700 shown in FIG. 7. For the purposes of example implementation 800, assume that user device UD1 is attempting to establish a connection using the IMS APN to an eHRPD network associated with a service provider, identified as SmartWireless.

As shown in FIG. 8A, and by reference number 805, UD1 may establish the connection using the IMS APN via PGW 230 (e.g., using the net2.swire APN). As shown by reference number 810, PGW 230 may send connection information, associated with the UD1 connection, to AAA server 240. The connection information may include a device identifier of UD1, information identifying a first network type (e.g., eHRPD) associated with the connection, information identifying the net2.swire APN, and information indicating the connection was established on Jul. 1, 2013 at 9:45 a.m. As shown by reference number 815, AAA server 240 may send the connection information, received from PGW 230, to HSS 250. As shown by reference number 820, HSS 250 may send the connection information, received from AAA server 240, to CSCF server 260. HSS 250 may send the connection information to CSCF server 260 based on determining that the connection information includes information associated with a connection using the IMS APN (e.g., based on the information identifying the use of the net2.swire APN). As shown by reference number 625, CSCF server 260 may store (e.g., in data structure 500) the connection information in a memory location associated with CSCF server 260.

As shown in FIG. 8B, and by reference number 830, UD1 may transmit a SIP message, associated with an IMS service, Rich Communication Service (RCS) Chat, via the Smart-Wireless Network. As shown, the SIP message may include information identifying a second network type (e.g., LTE) associated with the connection, and information identifying the net2.swire APN. As shown, CSCF server 260 may receive the SIP message (e.g., from a network device, such as PGW 230). As shown by reference number 835, CSCF server 260 may determine whether the second network type (e.g., the LTE network type included in the SIP message) matches the first network type (e.g., the eHRPD network type included in the connection information). As shown, CSCF server 260 may determine the connection information based on the connection information stored (e.g., in data structure 500) by CSCF server 260. As shown by reference number 835, CSCF server 260 may determine that the second network type does not match the first network type, and CSCF server 260 may modify the SIP message based on the first network type (e.g., by replacing "LTE" with "eHRPD" in the SIP message).

As shown by reference number 840, CSCF server 260 may provide the modified SIP message to an application server associated with the IMS service, identified as RCS Messaging server. The RCS Messaging server may then provide the RCS Messaging service to UD1 based on the modified SIP message. For example, the RCS Messaging server may implement specific billing and/or connection treatment procedures associated with providing the RCS Messaging service over an eHRPD connection (e.g., rather than managing the RCS Messaging service based on the incorrect network type, LTE, provided by UD1). In this manner, the RCS Messaging server may provide the RCS Messaging service based on the network type associated with the connection without relying on UD1 to provide the information identifying the network type.

As indicated above, FIGS. 8A and 8B are provided merely as an example. Other examples are possible and may differ from what was described with regard to FIGS. 8A and 8B.

Implementations described herein may allow an application server, providing a service to a user device, to receive information identifying a type of radio access network being used to provide the service to the user device without depending on the user device to provide information identifying the radio access network type. In some implementations, the information identifying the type of radio access network may be used by the application server (e.g., for billing purposes, for radio access network type specific treatment purposes, etc.) regardless of an access point name associated with the connection.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   receive connection information associated with a connection, between a user device and a network, used to provide an application service to the user device,
   the connection information including information identifying a first network type of the network,
   the connection information including information identifying an access point name associated with the connection,
   the application service being provided to the user device by a device associated with the application service;
   receive message information associated with the user device and the access point name,
   the message information identifying a second network type;
   determine that the information identifying the second network type does not match the information identifying the first network type;
   modify the message information to include the information identifying the first network type based on determining that the information identifying the second network type does not match the information identifying the first network type; and
   provide the modified message information to the device associated with the application service,
   the modified message information including at least a portion of the connection information, and
   the modified message information permitting the device associated with the application service to manage the application service based on the first network type.

2. The device of claim 1, where the one or more processors, when receiving the connection information associated with the connection between the user device and the network, are to:
   receive the connection information from a network device associated with the network.

3. The device of claim 1, where the one or more processors are further to:
   determine that the connection information includes information identifying an internet protocol multimedia subsystem (IMS) access point name;
   identify a device associated with managing signal and control functions of an IMS network based on determining that the connection information includes information identifying the IMS access point name; and
   where the one or more processors, when providing the modified message information to the device associated with the application service, are to:
   provide the modified message information to the device associated with managing signal and control functions of the IMS network based on identifying the device associated with managing signal and control functions of the IMS network.

4. The device of claim 1, where the one or more processors are further to:
   receive, from the device associated with the application service, a request for the connection information or the modified message information; and
   where the one or more processors, when providing the modified message information, are to:
   provide the modified message information based on receiving the request for the connection information or the modified message information.

5. The device of claim 1, where the one or more processors are further to:
   receive updated connection information associated with the user device and another network,
   the updated connection information indicating that the application service is being provided to the user device via the other network; and
   where the one or more processors, when providing the modified message information, are to:
   provide the modified message information,
   the modified message information including at least a portion of the updated connection information.

6. The device of claim 1, where the device associated with the application service includes at least one of:
   a device associated with managing billing procedures related to the application service; or
   a device associated with managing network type specific treatment of the application service.

7. The device of claim 1, where the one or more processors, when modifying the message information, are to:
   replace, in the message information, the information identifying the second network type with the information identifying the first network type.

8. A device, comprising:
   one or more processors to:

receive connection information associated with a connection between a user device and a network,
 the connection information including information identifying a first network type of the network,
 the connection information including information identifying an internet protocol multimedia subsystem (IMS) access point name associated with the connection;
store the connection information based on receiving the connection information;
receive message information associated with the user device and the IMS access point name,
 the message information identifying a second network type;
determine that the information identifying the second network type does not match the information identifying the first network type;
modify the message information to include the information identifying the first network type based on determining that the information identifying the second network type does not match the information identifying the first network type;
determine that at least a portion of the connection information is to be provided to a device associated with a service to be provided to the user device; and
provide the modified message information to the device associated with the service based on determining that at least the portion of the connection information is to be provided,
 the modified message information including the at least the portion of the connection information.

9. The device of claim 8, where the one or more processors are further to:
determine that the user device has established the connection to the network using the IMS access point name; and
where the one or more processors, when receiving the connection information, are to:
 receive the connection information based on determining that the user device has established the connection to the network using the IMS access point name.

10. The device of claim 8, where the one or more processors, when receiving the connection information associated with the connection between the user device and the network, are to:
receive the connection information from a network device associated with the network.

11. The device of claim 8, where the one or more processors, when receiving the connection information, are to:
receive the connection information from a device associated with managing subscription information associated with the user device.

12. The device of claim 8, where the one or more processors, when modifying the message information, are to:
replace the information identifying the second network type, included in the message information, with the information identifying the first network type, included in the connection information.

13. The device of claim 8, where the one or more processors, when providing the modified message information, are to:
provide the modified message information to a network device capable of managing signal and control functions in an IMS network.

14. A method, comprising:
receiving, by a device, connection information associated with a connection between a user device and a network used to provide an application service to the user device;
 the connection information including information identifying a first network type of the network,
 the connection information further including information identifying an access point name associated with the connection,
 the application service being provided by an application server;
receiving, by the device, message information associated with the user device and the access point name,
 the message information identifying a second network type;
determining, by the device, that the information identifying the second network type does not match the information identifying the first network type;
modifying, by the device, the message information to include the information identifying the first network type based on determining that the information identifying the second network type does not match the information identifying the first network type; and
sending, by the device, the modified message information to the application server,
 the modified message information including at least a portion of the connection information.

15. The method of claim 14, further comprising:
determining that the user device has established the connection to the network; and
where receiving the connection information further comprises:
 receiving the connection information based on determining that the user device has established the connection to the network.

16. The method of claim 14, further comprising:
receiving, from the application server, a request for the connection information or the modified message information; and
where sending the modified message information to the application server comprises:
 sending the modified message information based on receiving the request for the connection information or the modified message information.

17. The method of claim 14, further comprising:
determining that the application server is subscribed to receive the connection information or the modified message information; and
where sending the modified message information to the application server comprises:
 sending the modified message information based on determining that the application server is subscribed to receive the connection information or the modified message information.

18. The method of claim 14, further comprising:
receiving updated connection information associated with the user device and another network,
 the updated connection information indicating that the application service is being provided to the user device via the other network; and
where sending the modified message information to the application server comprises:
 sending the modified message information,
  the modified message information including at least a portion of the updated connection information.

19. The method of claim 14, where the application server includes at least one of:
a device associated with managing billing procedures related to the application service; or a device associated with managing network type specific treatment of the application service.

20. The method of claim 14, where modifying the message information comprises:

modifying the message information to include an indication that the second network type does not match the first network type.

* * * * *